Aug. 19, 1952     F. H. GILLESPIE ET AL     2,607,375
DOVETAILING ATTACHMENT

Filed July 31, 1948     6 Sheets-Sheet 1

FOREST H. GILLESPIE
HARRY C. LUCAS
DOMINIC P. MOTTA
INVENTORS

BY
Robert O. Fulwider
ATTORNEY

Aug. 19, 1952 F. H. GILLESPIE ET AL 2,607,375
DOVETAILING ATTACHMENT
Filed July 31, 1948 6 Sheets-Sheet 2

FOREST H. GILLESPIE
HARRY C. LUCAS
DOMINIC P. MOTTA
INVENTORS

BY Robert D. Fulwider
ATTORNEY

Aug. 19, 1952  F. H. GILLESPIE ET AL  2,607,375
DOVETAILING ATTACHMENT
Filed July 31, 1948  6 Sheets-Sheet 4

FOREST H. GILLESPIE
HARRY C. LUCAS
DOMINIC P. MOTTA
INVENTORS

BY Robert M. Fulwider
ATTORNEY

FOREST H. GILLESPIE
HARRY C. LUCAS
DOMINIC P. MOTTA
INVENTORS

BY Robert W. Fulwider
ATTORNEY

Aug. 19, 1952  F. H. GILLESPIE ET AL  2,607,375
DOVETAILING ATTACHMENT
Filed July 31, 1948  6 Sheets-Sheet 6
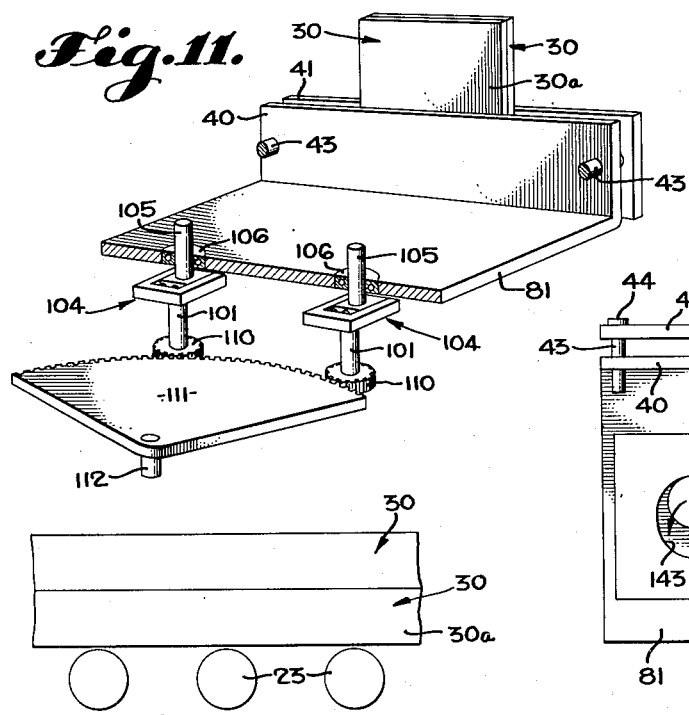
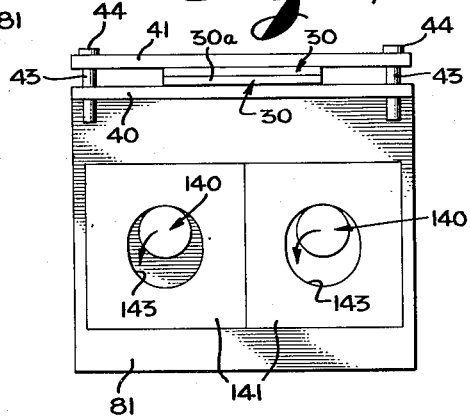
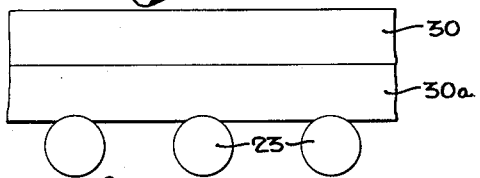
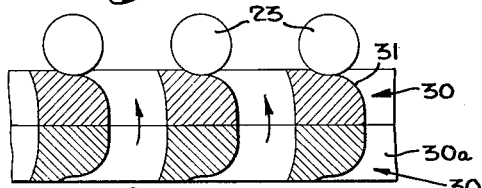
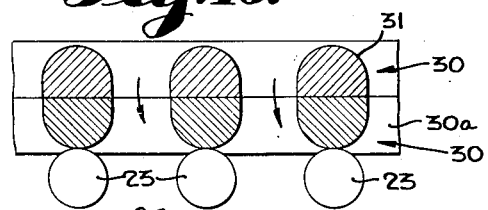
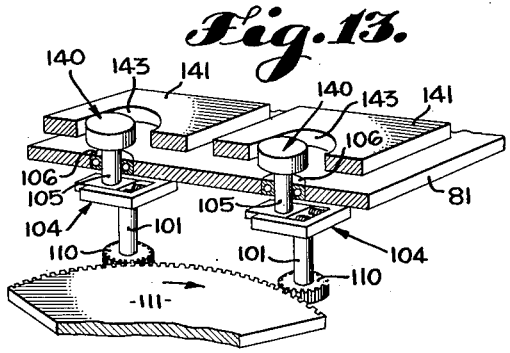
FOREST H. GILLESPIE
HARRY C. LUCAS
DOMINIC P. MOTTA
INVENTORS
BY Robert H. Fulwider
ATTORNEY Patented Aug. 19, 1952

2,607,375

UNITED STATES PATENT OFFICE 2,607,375

DOVETAILING ATTACHMENT

Forest H. Gillespie and Harry C. Lucas, Los Angeles, and Dominic P. Motta, Glendale, Calif.; said Lucas and said Motta assignors to said Gillespie Application July 31, 1948, Serial No. 41,734

12 Claims. (Cl. 144—87)

The present invention relates generally to woodworking machines, and more particularly to an attachment for such machines whereby a series of tenons projecting from the end of a board or other work piece may be formed to adapt the latter for attachment to another member having a series of mortises formed therein.

Mortise and tenon joints of the type above described are usually termed dovetail joints and are often used to attach the front of a drawer to the sides thereof, the tenons being formed in the sides and the mortises in the front of the drawer. The mortises formed in such furniture parts are "blind," that is, they do not extend through the front and are thus invisible when the drawer is closed. Such mortises are formed with a rotating dovetail cutter and thus are rounded at their inner ends. Accordingly, if a tight bond or glue joint is to be produced between the tenon and the mortise into which it fits, the tenon should preferably be formed with a rounded side adapted to fit into the rounded end of the mortise.

Such mortise and tenon joints are well known in the art and have usually been formed by holding the two pieces in which the mortises and tenons are to be cut, e. g., a drawer side and a drawer front, together in a machine and at right angles to each other, and by a single operation involving a plurality of rotating cutters, cutting the mortises in the one piece and the tenons in the other. Thereupon, the parts may be removed from the machine and the tenon piece reversed and placed in interlocking relation with the mortised piece. Such an arrangement is disadvantageous for quantity production, however, in that the mortise and tenon pieces must be kept together and particularly is it disadvantageous in the case of drawer fronts since each side piece has one set of tenons whereas the front has two sets of mortises.

Machines have been designed in the past in which a plurality of drawer sides, i. e., pieces in which tenons are to be formed, are held in "back-to-back" relationship and sets of tenons are simultaneously formed in the two pieces. Such machines usually involve a plurality of rotating dovetail cutters and a movable work table to which the work pieces may be clamped, and means to move the work table in an oval path whereby a series of oval-shaped projections are formed in the end of the two pieces, and when the pieces are separated, each has a series of the requisitely shaped semi-oval tenons.

It is in a machine of the latter class that the present invention is embodied.

A major object of the invention is to provide an attachment for producing dovetail tenons which is fully automatic in its operation.

Another object of the invention is to provide a machine which requires no manual manipulation thereof to produce the relative motion of the work and cutters whereby to promote uniformity in the various parts produced.

Still another object is to provide a machine of the character described which is safe to operate, involving a minimum of danger to operating personnel, however inexperienced.

Still another object of the invention is to provide, in such a machine, means for cutting a complete dovetailed tenon which is adapted to make intimate contact with the entire interior surface of a mortise to which it is assembled.

A further object of the invention is to provide in a machine of the class described for various adjustments to produce dovetail tenons of various shapes, sizes and spacings.

Yet another object of the invention is to provide dovetailing means in the form of an attachment to a mortising machine whereby to reduce the cost by eliminating the necessity for one entire machine for producing tenons and another for mortices.

The foregoing and other objects and advantages of the invention will be apparent from a consideration of the following detailed description of a machine embodying the same, such consideration being given likewise to the attached drawings, in which:

Figure 9 is an enlarged elevational section taken on the line 9—9 in Figure 6;

Figure 11 is a semi-schematic perspective view of the work-moving elements of the attachment of Figure 1;

Figure 12 is a semi-schematic plan view illustrating work-shaping cams employed in the attachment of Figure 1;

Figure 13 is a semi-schematic perspective view illustrating the operation of the parts shown in Figures 11 and 12; and Figures 14 through 17 are diagrammatic views illustrating the successive cutting operations resulting in the finished work pieces illustrated in Figure 2.

General description

Figure 1:
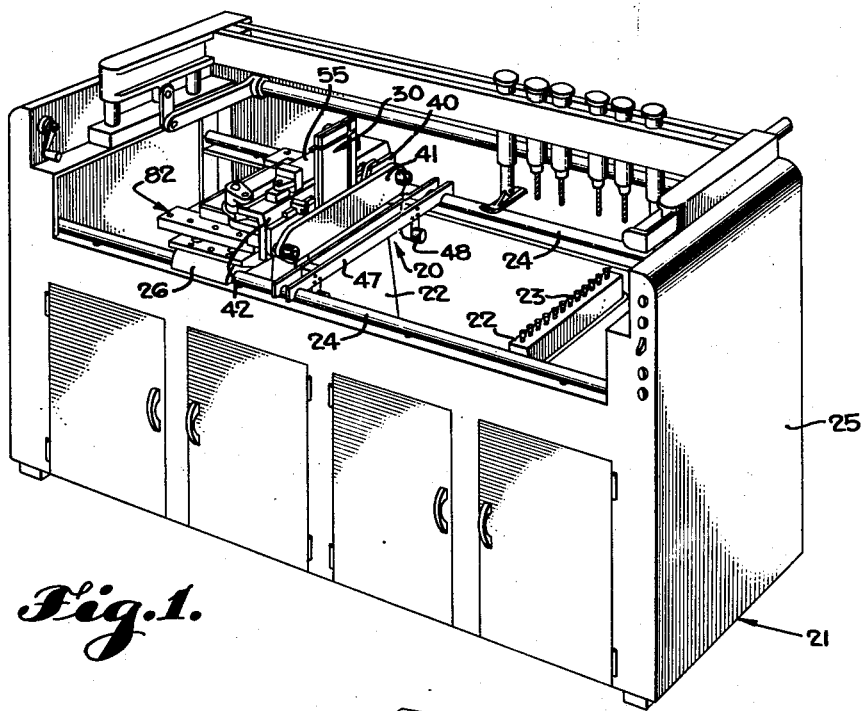
Figure 1 is a perspective view of a woodworking machine in which is mounted a dovetailing attachment constructed according to the present invention.
Figures 2, 10:
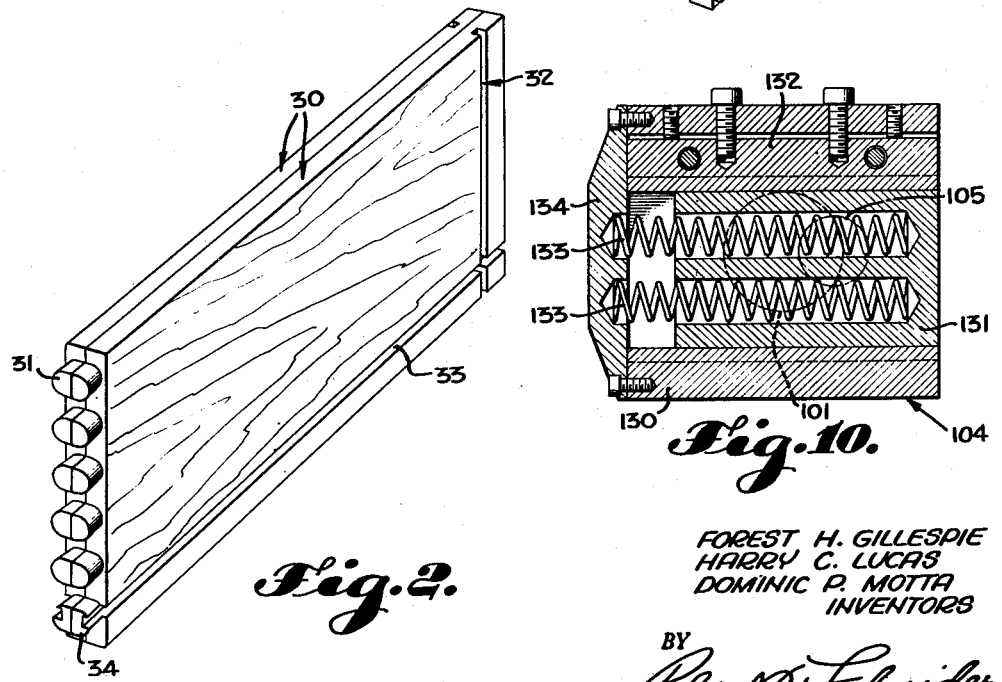
Figure 2 is an enlarged perspective view of a pair of drawer sides which have been operated on by the machine illustrated in Figure 1.
Figure 10 is an enlarged horizontal section taken on the line 10—10 in Figure 5.

The dovetailing attachment described herein is indicated generally throughout the drawings by the reference character 20, and is mounted in a multiple purpose woodworking machine 21. The woodworking machine 21 is designed to perform various woodworking operations, e. g., mortising drawer fronts, boring drawer pull attachment holes in drawer fronts, and other operations. The design and construction is substantially that set forth in the co-pending application, entitled Woodworking Machine, Serial No. 714,172, filed December 5, 1946, now Patent No. 2,593,744. Only such parts of the woodworking machine 21 as are pertinent to the present invention will be described herein. Among such pertinent parts are banks 22 of rotary cutters 23 which are movably mounted between longitudinal ways 24, supported generally in a cabinet 25.

Two banks 22 of rotary cutters 23 are employed in the woodworking machine 21, only one (that to the left in Figure 1) being employed in connection with the attachment 20. The attachment 20 itself includes: clamping mechanism adapted to grip and hold a pair of work pieces 30 with their ends projecting into the operating plane of the cutters 23; a movable work table carrying the clamping mechanism; work-moving mechanism adapted to move a table carrying the clamping mechanism and work pieces in a path around the cutters 23 whereby to form a series of dovetail tenons 31 in the work pieces; and work-shaping means operating in conjunction with the work-moving mechanism whereby the shape of the tenons 31 is controlled.

Figure 6:
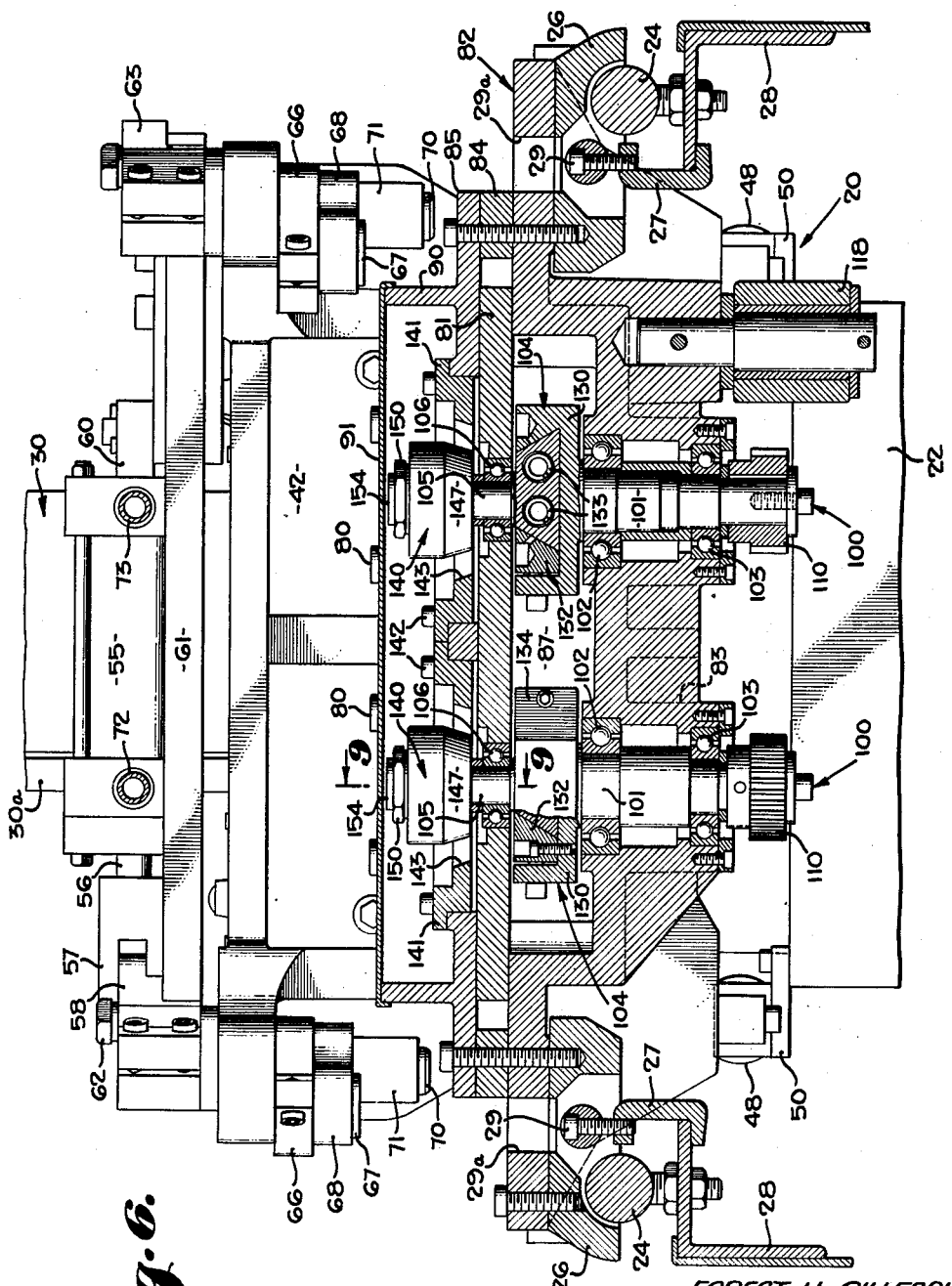
Figure 6 is an enlarged elevational section taken on the line 6—6 in Figure 3.

The entire attachment is mounted on the ways 24 by suitably shaped lips 26, and removably secured by dogs 27 which project under longitudinal frame members 28 of the machine and are tightened by bolts 29 (see Figure 6).

The attachment 20 is adapted for continuous cyclic operation, each cycle of which starts with the work-moving table in a stationary position, the complete cycle being as follows:

1. The clamping mechanism moves to a closed position gripping the work pieces 30 and moving the same into operative engagement with the cutters 23, 2. The table moves in an ovoid path whereby each of the individual cutters 23 moves around a tenon 31, forming the same, 3. The clamping mechanism opens, removing the completed work pieces 30 from operative enagement with the cutters 23, finally releasing the same whereby they may be manually removed from the machine.

Thus, it will be seen that the operator of the woodworking machine 21 with the attachment 20 therein merely places pairs of work pieces 30 in the clamping mechanism of the attachment 20 and removes the same when the automatic operation of the machine has formed the tenons 31 therein.

In Figures 11 through 13, the basic structural elements of the attachment have been semi-schematically illustrated in order to assist in visualizing the construction and operation of the machine.

Work pieces

The particular work pieces 30 described in connection with the operation of the invention herein are the sides of conventional sliding drawers used in desks, bureaus, and similar pieces of furniture. As shown herein, they have previously been formed with a pair of intersecting grooves 32, 33 which receive the back and the bottom of the drawer, respectively, when the members 30 are assembled into a finished drawer. The series of spaced tenons 31 formed in the forward ends of the work pieces 30 will be seen to be portions of ovoid conic frustrums, the larger end of the conic frustrum being the outer end of the tenon 31. Thus, it will be seen that each tenon 31 is adapted to enter a mortise formed by a rotary dovetail cutter. In particular, it should be noted that the conical surface of the tenon 31 is a complete curve and that no flat portion is left which would result in a void in the completed joint. The lowermost tenons 34 are partially distorted by reason of the lower groove 33 and where this distortion is objectionable, it may be avoided by positioning the groove 33 below the lowermost tenon 31.

Clamping mechanism

Figure 5:
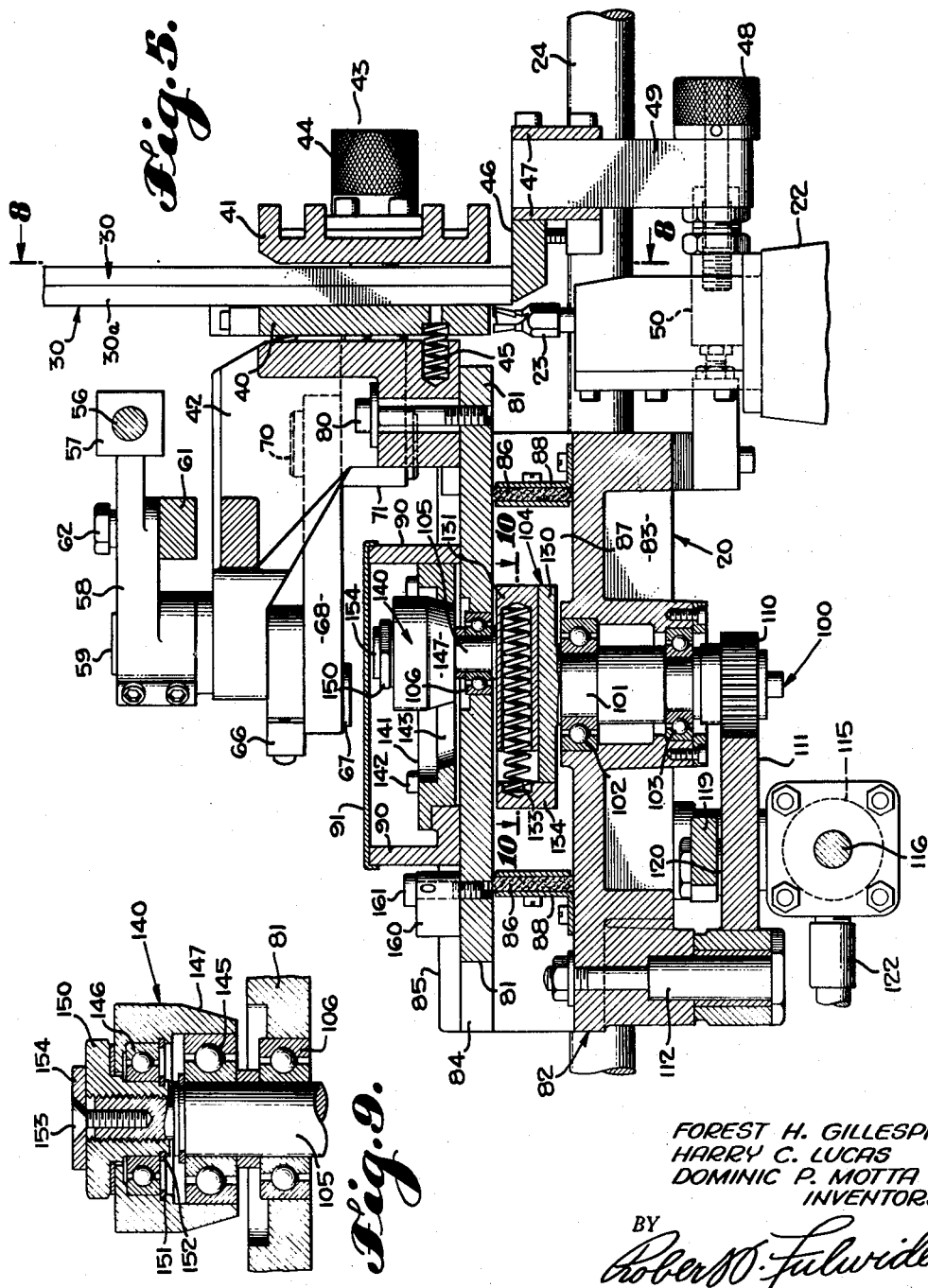
Figure 5 is an enlarged elevational section taken on the line 5—5 in Figure 3.

The details of the clamping mechanism are best seen in Figures 3, 4, 5 and 6. Here it will be seen that the work pieces 30 are clamped in a vertical position between inner and outer vise jaws 40 and 41, respectively. As best seen in Figure 5, the vise jaws 40 and 41 are held in parallel alignment with each other and with the front face of a supporting frame 42 by means of a pair of parallel rods 43 which pass through these members adjacent the ends thereof. At the outer ends of the rods 43 (right in Figure 5), a pair of knurled nuts 44 are threaded onto the rods whereby inward motion thereof pulls the outer vise jaw 41 toward the supporting frame 42. The outer vise jaw 41 is fixed to the rods 43 and is normally held in an outward or open position at the beginning of each cycle of operation of the attachment 20.

At the beginning of the work cycle previously described, inward motion of the outer vise jaw 41 clamps the work pieces 30 against the inner vise jaw 40. As will be noted from an examination of Figure 5, the inner vise jaw 40 is urged outwardly by a plurality of compression springs 45 positioned in suitable recesses in the forward face of the supporting frame 42. Continued inward motion of the outer vise jaw 41 after the clamping of the work pieces 30 moves the inner vise jaw 40 inwardly towards the supporting frame 42. The inward motion of the inner vise jaw 40 permitted by the compression of the springs 45 carries the lower end of the innermost work piece 30a into engagement with the rotating cutters 23, thus to start the operation of cutting the tenons in the work pieces 30.

A horizontal supporting shelf 46 is mounted adjacent the cutters 23 whereby to support the work pieces 30 by the ends thereof when they are initially placed between the vise jaws 40 and 41. The shelf 46 is secured between the ways 24 by means of cross bars 47 and is held in place by a pair of bolts 48 in the lower ends of vertical extensions 49, the bolts 48 being threaded into frame members 50 extending from the bank 22 of cutters.

Figure 8:
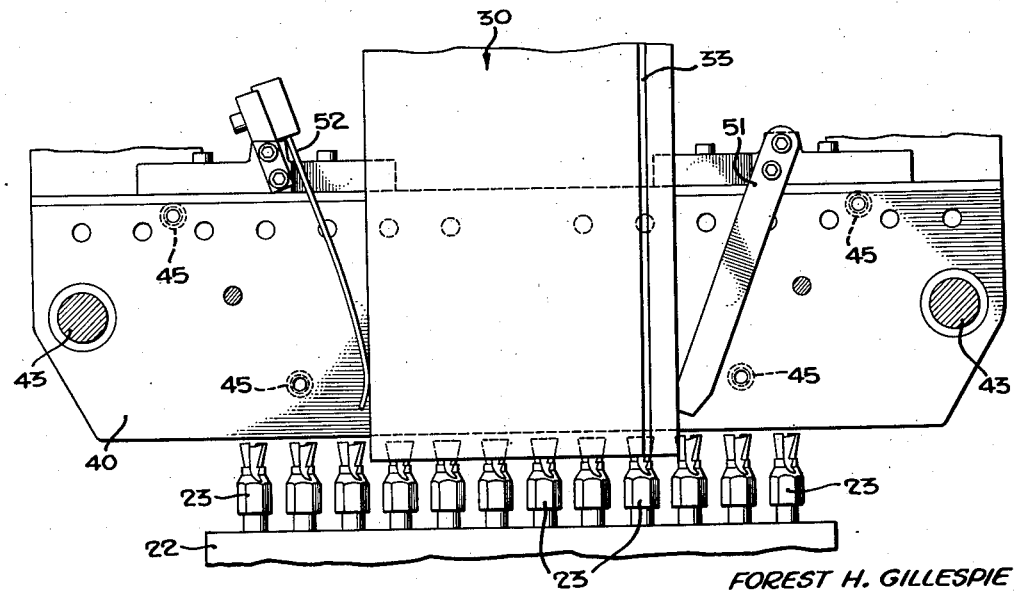
Figure 8 is an enlarged fragmentary elevational view taken on the line 8—8 in Figure 5.

As best seen in Figure 8, an adjustable stop member 51 and a leaf spring 52 serve to laterally position the work pieces 30 as they are dropped into place between the vise jaws 40—41.

The power to draw inwardly on the clamping rods 43 whereby to urge the vise jaws 40—41 together and thereafter move the work pieces 30 into the cutters 23 is supplied by a hydraulic cylinder 55 mounted above the clamping mechanism (Figure 3) and having a movable piston therein operating through a piston rod 56 with a clevis 57 on the outer end thereof. A crank arm 58, pivotally connected at its outer end to the clevis 57, serves to rotate a rock shaft 59 each time the hydraulic cylinder 55 is actuated. It will be noted that the cylinder 55 is pivotally attached by a bracket 60 at its rearward end whereby to permit the entire cylinder 55 to swing sideways slightly to accommodate the arcuate motion of the outer end of the crank arm 58.

A cross link 61, pivotally connected by a bolt 62 to an intermediate point in the crank arm 58, serves to cooperatively connect the crank arm 58 to a short crank 63 keyed to a forward rock shaft 64. Thus, each actuation of the hydraulic cylinder 55 results in simultaneous swinging motion of the cranks 58 and 63, and therefore simultaneous rotation of the two rock shafts 59 and 64.

At the lower ends of the rock shafts 59 and 64, cranks 66 are secured thereto as best seen in Figure 5, the cranks 66 being provided with crank pins 67 operating through connecting rods 68 to actuate the clamping rods 43, the latter two members being pivotally connected by a wrist pin 70 held in a suitable boss 71 formed in the rearward end of each of the clamping rods 43.

Hydraulic fluid connections 72 and 73 at the ends of the cylinder 55 serve to connect flexible conduits 74 whereby hyraulic fluid is delivered to and from the ends of the cylinder 55 in order to actuate the piston therein. The delivery of hydraulic fluid to the piston 55 is controlled by a timer (not shown) so that at the beginning of each work cycle, fluid is delivered to the inner end of the cylinder through the connection 73 and from the cylinder through connection 72 whereby to thrust the piston rod 56 outwardly, rotating the cranks 58 and 63 counter-clockwise (in Figure 3) and from the arrangement of the lower cranks 66, it will be seen that such counter-clockwise rotation draws inwardly on the rods 43 to close the vise jaws 40—41. At the end of the work cycle, the direction of fluid flow is reversed, and fluid is introduced through the outer fluid connection 72 to draw inwardly on the piston rod 56 whereby to operate through the above described linkage to open the vise jaws 40—41, permitting withdrawal of the finished work pieces 30.

Table

As is best seen in Figure 5, the entire clamping mechanism is mounted by means of bolts 80 to a flat work table 81. The work table 81 in turn rests on a bed plate 82 which is formed with a central recess 83 whereby the table 81 bears only at its edges on the upper surface of the bed plate 82. Spaced above the upper surface of the bed plate 82 by spacers 84 is a hold-down plate 85 which functions to slidably retain the table 81 against the bed plate 82. The thickness of the spacers 84 is very slightly greater than the thickness of the table 81 whereby the latter may slide in any direction in the plane of the bed plate surface. In Figure 6, it will be noted that the sides of the bed plate 82 are spaced from the spacers 84 whereby lateral motion of the table is permitted and in Figure 5 it will be seen that the table may also move longitudinally, sliding on the bed plate 82.

Transverse strips 86 of felt or other similar material bear against the under surface of the table 81 to seal off an interior cavity 87 in which is located the work-moving mechanism, later to be described. The strips 86 are secured in place by means of brackets 88.

The hold-down plate 85 is formed with an upstanding wall 90 adapted to receive a cover plate 91 whereby to enclose the work-guiding mechanism, later to be described.

Work-moving mechanism

It will be remembered that, during the operation of cutting the tenons 31, the clamping mechanism and the work pieces 30 carried thereby is moved in a curved path with respect to the cutters 23. This movement is accomplished in the present machine by means of parallel and coordinately moving cranks 100. The cranks 100 are vertically disposed in side-by-side relationship, as shown in Figure 6, and each comprises a main shaft 101 journalled in a pair of radial ball bearings 102 and 103, a crank arm indicated generally by the reference character 104, and a crank pin 105. Each of the crank pins 105 is rotatably secured in the table 81 by means of a radial ball bearing 106. Accordingly, concurrent rotation of the two cranks 100 results in an oscillatory motion of the table 81 carrying the work pieces 30 in a path around the cutters 23. By virtue of the fact that two cranks are used, the clamping mechanism and the work pieces 30 held thereby are at all times during the oscillatory motion parallel to the initial starting position.

Each of the crank shafts 101 has keyed to the lower end thereof a pinion 110, and the pinions 110 are in common mesh with a sector gear 111. The sector gear 111 is located under the bed plate 82 and is pivotally carried by a downwardly extending shaft 112 fixed in the bed plate.

Thus, it will be seen that when the sector gear 111 is rotated in either direction about the pivot shaft 112, concurrent rotation of the cranks 100 is produced. The number of teeth in the sector gear 111 is sufficient so that swinging the latter in one direction or the other from one limit of its position to the other limit thereof produces a 360° rotation of each of the pinions 110, and hence of the cranks 100.

Figure 7:
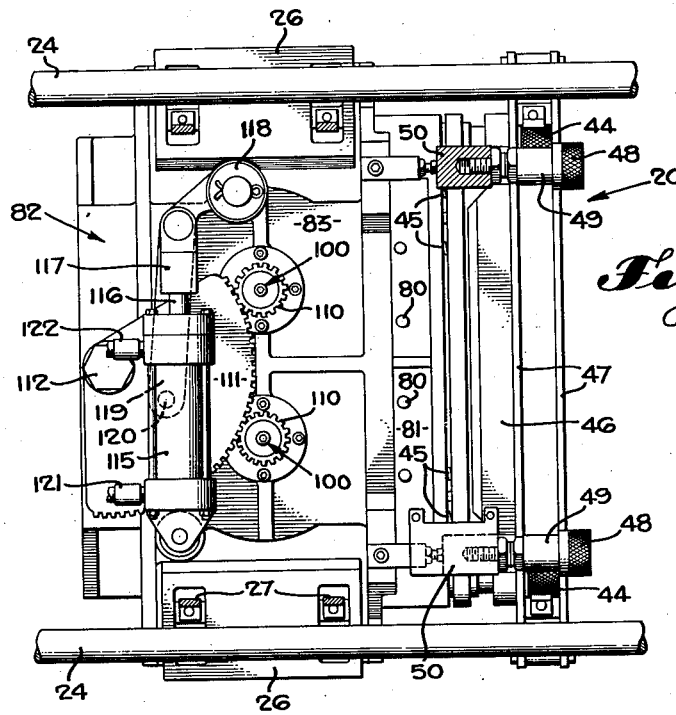
Figure 7 is a fragmentary bottom plan view of the attachment in Figure 1.

Power to move the sector gear 111 as above stated is produced through a pivotally mounted hydraulic cylinder 115 (Figure 7) having a piston rod 116 with a clevis 117 on the forward end thereof.

Inward or outward motion of the piston rod 116 is transmitted to the sector gear 111 through a double arm crank 118 pivotally mounted to the bed plate 82 and a connecting rod 119 connected by a pivot pin 120 to the sector gear 111 at a point spaced from the center of rotation thereof.

As with the hydraulic cylinder 55 in the clamping mechanism, the work-moving cylinder 115 is provided with fluid connections 121 and 122 whereby hydraulic fluid may be delivered to or from either side of the piston therein whereby to move the clevis 117 inwardly or outwardly.

As above stated, a single stroke of the clevis 117 in either direction is sufficient to rotate the pinions through 360° and to thereby complete one cyclic motion of the table 81 and the clamping mechanism and work pieces carried thereby. Thus on one work cycle, the clevis 117 moves outwardly of the cylinder 115 and on the next succeeding work cycle moves inwardly thereof, and so on, alternately in one direction or the other. The alternate motion of the clevis 117 just described results in alternate clockwise and counter-clockwise oscillatory motion of the work table during succeeding work cycles, but it is obviously immaterial which direction the work moves around the cutters 23 in producing the tenons 31.

*Work-guiding mechanism*

It will be realized that if the cranks 100 were conventional, having a fixed "throw," the result would be to move the work pieces 30 in a circular path around the cutters 23. It will be remembered, however, that a semi-oval shaped tenon is required rather than a semi-circular tenon. Thus, it is necessary to change or guide the circular motion of the crank pins 105 to distort such motion into an oval path rather than a circular path.

This distortion of the path into the desired oval movement is accomplished by making the throw or axial displacement of the crank pins 105 variable during the work cycle, and providing guide means by which this throw is adjusted during the work cycle to produce an oval path. To provide the adjustable throw just described, the crank arm 104 is made in two separate and relatively slidable parts, the lowermost 130 being formed as part of the crank shaft 101 and having a dovetail way formed therein, as can be seen in the right-hand crank in Figure 6. The uppermost crank arm member 131 is shaped for a sliding fit in the way of the lower crank arm portion 130 and an adjustable gib 132 (see Figure 6) is provided whereby to take up for wear in the way. The crank pin 105 is fixed in the movable crank arm portion 131.

Thus, it will be seen that, as the movable crank arm portion 131 slides back and forth in the way of the fixed portion 130, the displacement of the axis of the crank pin 105 with respect to the axis of the crank shaft 101 is varied. Each crank arm is provided with a pair of compression springs 133 anchored against an end cap 134 and thrusting against the movable crank arm portion 131 whereby to urge the same outwardly, viz, in a direction to increase the throw of the crank.

In order to limit the outward motion of the crank pins 105 urged by the spring 133, the crank pins 105 are extended upwardly beyond the upper surface of the movable table 81 and each carries, rotatably mounted thereon, a tapered roller 140. Each of the rollers 140 bears against an inner curved track in a cam or jig plate 141 fixed in the hold-down plate 85. The jig plates 141 are located within the enclosure formed by the upstanding wall 90 and are removably secured to the hold-down plate 85 by means of bolts 142.

Figure 3:
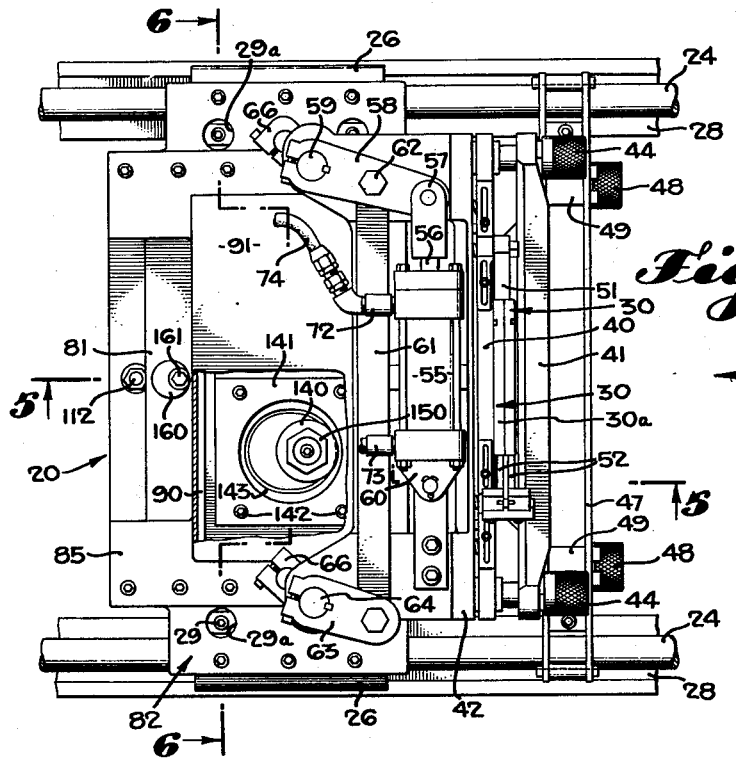
Figure 3 is a fragmentary top plan view of the woodworking machine of Figure 1, showing in particular the dovetailing attachment.
Figure 4:
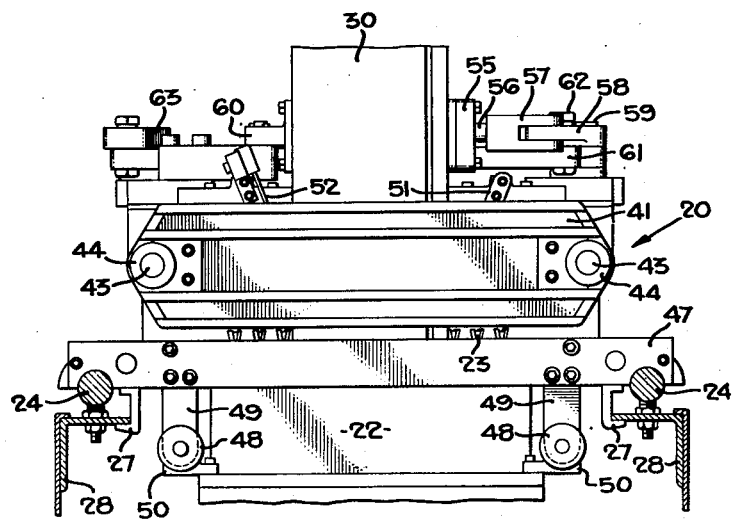
Figure 4 is an end elevational view of the attachment shown in Figure 3, taken in the direction indicated by the arrow 4 in Figure 3.

Each jig plate 141 is coaxially positioned with respect to one of the crank shafts 101, and as can be seen best in Figure 3, the interior track 143 is ovoid in shape, thus guiding the roller and as a consequence the crank pin 105 in an oval path around the axis of the crank shaft 101.

The roller 140 is held in intimate contact with the track 143 by reason of the outwardly thrusting springs 133, as previously stated.

In order to provide the parallel motion previously described, it is, of course, essential that the path followed by each of the rollers 140 be identical both in shape and size. The shape of the path is determined by the shape of the track 143 and for this reason, the two tracks are carefully ground to be identical in both plates 141.

Means for providing further adjustment to adjust the size of the oval path followed by the roller 140 is illustrated in Figure 9. Here it will be seen that each roller 140 is rotatably carried by the crank pin 105 on lower and upper radial ball bearings 145 and 146, respectively. It will be noted further that the recess in the roller 140 in which the lower radial bearing 145 is received is somewhat deeper than the width of the bearing, thus making possible vertical motion of the roller 140 with respect to the bearing 145. It will be noted also that the cam-track-contacting face 147 is tapered and is somewhat wider than the face of the cam track 143. Thus the roller 140 may be moved upwardly or downwardly, decreasing or increasing the effective diameter thereof, and consequently increasing or decreasing the diameter of the oval path followed by the roller. Means for effecting upward and downward motion of the roller 140 to change the effective diameter thereof is provided by anchoring the inner race of the upper bearing 146 to a hexagonally flanged bushing 150 threaded onto an extension of the crank pin 105 and anchoring the outer race of the bearing 146 into its recess in the roller 140. Such anchorage of the races of the bearing 146 is provided by means of snap rings 151 and 152, respectively. It will be seen, therefore, that rotation of the bushing 150 on the threaded extension of the crank pin 105 will move the roller upwardly or downwardly. A lock screw 153 and a washer 154 serve to lock the bushing 150 in any adjusted position thereof.

Whenever it is desired to remove the jig plates 141, for example, when changing the size of tenons 31 cut in the work pieces 30, it is necessary to relieve the outwardly thrusting pressure of the roller 140 against the cam tracks 143. For this purpose, an eccentric member 160 is mounted on the rear upper surface of the table 81 by means of a bolt 161. When it is desired to remove the jig plates 141, the member 160 may be rotated by means of a spanner wrench hole therein to bear against the rear surface of the upstanding wall 90. Such rotation of the member 160 forces the table 81 rearwardly, and thus (when the machine is in the stationary position illustrated in Figure 5) moves the roller 140 rearwardly away from the cam track 143 compressing the springs 133 in the crank arm 104.

During operation of the attachment described herein, the cover 91 is left in place on the wall 90 whereby to prevent dust, shavings, and so forth, from entering the enclosure thereunder and possibly interfering with the proper action of the rollers 140.

*Operation*

The successive operations of the clamping mechanism and movements of the work table are timed or "programmed" by a plurality of hydraulic valves operated sequentially by suitable timing mechanism. Such timing or programming mechanisms are well-known in connection with automatic hydraulic machinery and for this reason no detailed description thereof is deemed to be necessary herein. Suffice it to say, that each of the hydraulic connections of the two hydraulic cylinders 55 and 115 is provided with a solenoid valve which valve is in turn actuated by a time switch at the proper point in the sequence of operations.

Figures 14 through 17 show the successive relative positions of the cutters 23 and the work pieces 30 which ultimately result in the formation of the tenons 31. It will be realized, of course, that the motion of the work pieces 30 around the cutters 23 can be considered as relative, and the operation can be equally well described by referring to the motion of the cutters around the work pieces 30.

Figure 14 illustrates the relative position of the work pieces 30 and the cutters 23 at the start or rest position, wherein the work pieces 30 have just been introduced between the vise jaws 40 and 41, and just prior to the closing of the vise jaws. Figure 15 illustrates the relative position after the vise jaws have closed, and it should be noted that the cutters 23 have slightly entered the innermost work piece 30a. This initial cutting action of the cutters 23 is important by reason of the fact that the tenons 31 to be formed are tapered and that if initial longitudinal motion were not provided for, the tenons would have flat spots on them adjacent the surface of the inner work piece 30a.

After the initial longitudinal motion effected by the operation of the upper hydraulic cylinder 55, the timing mechanism operates to deliver hydraulic fluid to one end of the lower hydraulic cylinder 115, simultaneously releasing the fluid from the other end of that cylinder. This results in a stroke of the clevis 117 which, as previously stated, operates through the sector gear 111, the pinions 110, the cranks 100 and the table 81 to move the work pieces in an ovoid path around the cutters 23 to form the tenons 31 therein. The end or "completed" position is illustrated in Figure 17, and it will be realized that the opening operation of the vise jaws 40—41 at this point serves to move the work pieces 30 away from the cutters 23 and permit withdrawal thereof.

The arrows in Figures 16 and 17 illustrate the relative motion of the cutters 23 through the work pieces, although it will be realized that the latter members are actually in motion while the cutters are stationary.

The cutters 23 being located under the clamping mechanism and behind the shelf 46, it is virtually impossible for an operator to inadvertently come in contact with the cutters 23 and be injured thereby.

Whenever it is desired to remove the attachment 20 from the woodworking machine 21, in order that the latter may be used for other purposes, the removal is quickly accomplished by loosening the clamping bolts 29, suitable apertures 29a being provided in the bed plate to give access to the clamping bolts.

The attachment illustrated and described herein has been found to produce great uniformity in the tenons produced, due to the fact that, upon each successive operation, the cutters move at exactly the same speed through the work and are always guided in exactly the same path. Such automatic operation provides a considerable advantage over previous machines which are manually operated, and wherein the uniformity of the work depends on the operator applying exactly the same force to move the work through the cutters and guiding the work in the same path each time the machine is operated.

The present attachment is capable of forming a wide variety of differently shaped parts by interchanging the jig plates 141, special provision having been made to simplify this operation.

While the attachment shown and described herein is fully capable of achieving the objects and providing the advantages hereinbefore stated, it will be realized that it is capable of considerable modification without departing from the spirit of the invention. For this reason, we do not mean to be limited to the form shown and described, but rather to the scope of the appended claims.

We claim:

1. In a woodworking machine: a power driven cutter; support structure including a table supported for curvilinear movement in a given plane; clamp means mounted on said table adapted to grip a work piece and move the same into initial cutting engagement with said cutter; drive means to move said table in said plane whereby to effect relative movement of said cutter through said work piece, said drive means including a pair of concurrently rotating cranks, each having an adjustable throw and a crank pin projecting through said table and journalled therein; and cam means to guide said table whereby to produce a predetermined shape of cut in said work piece, said cam means including a pair of cam track members mounted in fixed position adjacent said table and followers on said crank pins in engagement with said cam tracks whereby the throw of said cranks is varied during rotation thereof.

2. In a woodworking machine: a power driven cutter; support structure including a table supported for curvilinear movement in a given plane; clamp means mounted on said table adapted to grip a work piece and move the same into initial cutting engagement with said cutter; drive means to move said table in said plane whereby to effect relative movement of said cutter through said work piece; and cam means to guide said table, said cam means including a pair of spaced apart in said plane and substantially identical non-circular cam track members and a pair of followers connected to said table and each in engagement with one of said cam track members whereby to produce a predetermined shape of cut in said work piece.

3. In a woodworking machine: a plurality of vertically disposed dovetail cutters arranged side-by-side in a straight line; support structure including a pair of flat horizontal spaced parallel plates and a table slidably held therebetween for curvilinear movement in a plane perpendicular to the axis of said cutters; clamp means mounted on said table and having a pair of movable spaced jaw members adapted to move relatively toward each other to grip a work piece therebetween with a lower end thereof adjacent said cutters and thereafter move in unison, said clamp means including power means to move said jaw members to first clamp said work piece and thereafter move the same into initial cutting engagement simultaneously with all of said cutters; work-moving means including at least one adjustable-throw crank having a pin journalled in said table and means including a drive member in engagement with said crank to rotate the same to move said table; and guide means including an internal cam fixed to one of said plates adjacent said crank and a follower on said crank pin engaged with said cam whereby to guide said pin in a non-circular path as said crank rotates.

4. In a clamping mechanism for gripping a work piece and moving the same into cutting engagement with a cutter: a support member having a vertical face adapted to be held stationary with respect to said cutter; a pair of reciprocable tension rods perpendicular to said face and projecting therefrom; a first jaw member connected to the outer ends of said rods, said first jaw member being parallel to said face, a second jaw member slidably mounted on said rods and parallel to said first jaw member and spaced therefrom; compression spring means positioned between said face and said second jaw member to normally hold the latter away from said face; a pair of cranks journalled in said support member; a link member interconnected between said cranks to effect concurrent rotation thereof; a pair of connecting rods each connected between one of said tension rods and one of said cranks whereby rotation of said cranks moves said tension rods in unison selectively toward or away from said face; and power means including a hydraulic cylinder and piston rod connected to one of said cranks whereby to actuate the same to selectively move said tension rods inwardly to clamp a work piece between said jaw members and thereafter move the same into cutting engagement with said cutters, compressing said spring means, or to move said tension rods outwardly to release said work piece.

5. In a woodworking machine of the type having a movable work-holding clamp and a rotating cutter, means to move said clamp in a predetermined path with respect to said cutter which includes: movable table means supporting said clamp; a pair of spaced apart cranks each having a pin journalled in said table means; means to concurrently rotate said cranks; and means to guide the movement of said pins in non-circular paths.

6. In a woodworking machine of the type having a movable work-holding clamp and a rotating cutter, means to move said clamp in a predetermined path with respect to said cutter which includes: movable table means supporting said clamp; a pair of spaced apart cranks, each having an adjustable throw and a pin projecting through said table means and journalled therein, each of said pins having a portion projecting beyond the plane of said table; means to concurrently rotate said cranks; and a pair of fixed, non-circular cam track members engaged with said projecting pin portions whereby to guide the movement of said pins in a non-circular path.

7. In a woodworking machine of the type having a movable work-holding clamp and a rotating cutter, means to move said clamp in a predetermined path with respect to said cutter which includes: movable table means supporting said clamp; a pair of spaced apart cranks, each of said cranks having an adjustable throw and a crank pin journalled in said table means; means to concurrently rotate said cranks; spring means in each of said cranks to urge said pins in a throw-increasing direction; and non-circular cam track means engaged with each of said pins and adapted to restrain said throw-increasing movement thereof whereby to guide said pins in a non-circular path upon rotation of said cranks.

8. In a woodworking machine of the type having a movable work-holding clamp and a rotating cutter, means to move said clamp in a predetermined path with respect to said cutter which includes: a flat table supporting said clamp, said table being supported for sliding curvilinear motion in a plane perpendicular to said cutter; a pair of substantially identical cranks, each having a rotatably mounted main shaft perpendicular to the plane of said table, a telescoping arm adapted to change the throw of said crank, a crank pin in said arm, a spring in said arm normally urging extension thereof to increase the throw of said crank, said crank pins being journalled in said table whereby to effect parallel motion of said table upon rotation of said cranks, each of said pins having a portion projecting beyond said table; means including a drive member in common driving engagement with said cranks to concurrently rotate the same; and a pair of non-circular cam track members, one mounted in fixed position adjacent each of said cranks and in engagement with said projecting pin portion whereby to restrain said spring-urged extension of said crank arms and guide said crank pins in non-circular paths.

9. In a woodworking machine of the type having a movable work holding clamp and a rotating cutter, means to move said clamp in a predetermined path with respect to said cutter which includes: movable table means supporting said clamp; a crank having an adjustable throw and a pin journaled in said table means; means to rotate said crank; a cam having a guide surface disposed substantially in a given plane, fixed with respect to said table, and positioned adjacent thereto; and a follower mounted on said table projecting therefrom, and being engaged with said guide surface whereby to guide said table in a predetermined path as said crank is rotated.

10. The construction of claim 9 further characterized in that said follower is tapered along an axis substantially perpendicular to the plane of said guide surface, and selectively movable along said axis to adjust the length of said path.

11. The construction of claim 10 further characterized in that said follower is a tapered roller rotatably mounted on an axis fixed with respect to said table.

12. In a woodworking machine of the type having a movable work-holding clamp and a rotating cutter, means to move said clamp in a predetermined path with respect to said cutter which includes: movable table means supporting said clamp; a pair of spaced apart cranks, each of said cranks having an adjustable throw and a crank pin journalled in said table means; means to concurrently rotate said cranks; and means to guide the movement of said pins in non-circular paths.

FOREST H. GILLESPIE.
HARRY C. LUCAS.
DOMINIC P. MOTTA.

REFERENCES CITED

The following references are of record in the file of this patent:

UNITED STATES PATENTS

| Number | Name | Date |
|---|---|---|
| 1,694,115 | Bottcher | Dec. 4, 1928 |
| 1,860,660 | Dart | May 31, 1932 |
| 2,225,263 | Farrell | Dec. 17, 1940 |
| 2,260,662 | Farrell | Oct. 28, 1941 |
| 2,299,602 | Teague | Oct. 20, 1942 |
| 2,314,179 | Teague | Mar. 16, 1943 |